(12) United States Patent
Cox

(10) Patent No.: US 6,884,055 B2
(45) Date of Patent: Apr. 26, 2005

(54) POTTING COMPOUND INJECTION APPARATUS AND METHOD OF INJECTING POTTING COMPOUND INTO PANEL CELLS

(75) Inventor: Gordon M. Cox, Issaquah, WA (US)

(73) Assignee: The Boeing Company, Seattle, WA (US)

( * ) Notice: Subject to any disclaimer, the term of this patent is extended or adjusted under 35 U.S.C. 154(b) by 304 days.

(21) Appl. No.: 10/157,684

(22) Filed: May 29, 2002

(65) Prior Publication Data

US 2003/0222377 A1 Dec. 4, 2003

(51) Int. Cl.⁷ .............................................. B29C 70/68
(52) U.S. Cl. .................... 425/110; 222/181.2; 222/389; 425/127; 425/449
(58) Field of Search ............................... 425/110, 449, 425/256, 258, 127, 4 R; 239/525; 222/181.1, 181.2, 183, 389

(56) References Cited

U.S. PATENT DOCUMENTS

| | | | | |
|---|---|---|---|---|
| 1,584,863 A | * | 5/1926 | Josephson | 222/340 |
| 3,886,023 A | * | 5/1975 | Deplante | 156/253 |
| 3,948,317 A | * | 4/1976 | Moore | 165/165 |
| 4,670,206 A | * | 6/1987 | Nakagaki et al. | 264/87 |
| 4,671,431 A | * | 6/1987 | Obrist | 222/327 |
| 4,716,067 A | * | 12/1987 | Moji et al. | 428/117 |
| 5,211,755 A | * | 5/1993 | Hangley, II | 118/306 |
| 5,567,499 A | * | 10/1996 | Cundiff et al. | 428/116 |
| 5,759,272 A | * | 6/1998 | Lisec | 118/323 |
| 5,887,764 A | * | 3/1999 | Ennis et al. | 222/389 |
| 6,068,164 A | * | 5/2000 | Totaro | 222/389 |

FOREIGN PATENT DOCUMENTS

| | | | | |
|---|---|---|---|---|
| EP | 1120509 A1 | * | 8/2001 | E04C/2/36 |
| JP | 01198951 A | * | 8/1989 | E04C/2/36 |
| JP | 09141665 A | * | 6/1997 | B29C/33/38 |
| WO | WO 03/055673 A1 | * | 7/2003 | B32B/3/12 |

* cited by examiner

Primary Examiner—Robert B. Davis
(74) Attorney, Agent, or Firm—Alston & Bird LLP (57) ABSTRACT

A potting compound injection apparatus includes a pneumatic tube for inserting single part potting compound and injecting the compound into the cells of a composite panel. The pneumatic tube has an open end for releasing potting compound and an opposed end interconnected to a pneumatic pressure source. The potting compound injection apparatus may also include a frame for maneuvering the pneumatic tube with respect to the composite panel. A method of injecting a potting compound includes applying potting compound through a pneumatic tube into a composite panel having cells.

18 Claims, 6 Drawing Sheets

POTTING COMPOUND INJECTION APPARATUS AND METHOD OF INJECTING POTTING COMPOUND INTO PANEL CELLS

FIELD OF THE INVENTION

The present invention relates to inserting potting compound into composite panel cells, and more particularly, to an apparatus for pneumatically injecting a potting compound into composite panel cells and a method of pneumatically injecting a potting compound into composite panel cells.

BACKGROUND OF THE INVENTION

The use of composite structures in the aerospace industry has become more and more prevalent due to the desirable properties of composites, especially low weight, high strength and stiffness, resistance to corrosion, and damping characteristics among other properties. Composite materials are now being used for aircraft wings, horizontal and vertical stabilizers, nose and tail cones, and other aircraft structural elements. The advantageous properties of composites have increased aircraft performance benefits, including increased range, decreased fuel consumption, and greater payload. Added performance benefits guide the use of composites throughout the aerospace industry. However, the primary shortcoming of composites has been high cost, and the aerospace industry is continuing to explore ways to improve the cost of composite manufacturing while maintaining the performance benefits of composite materials. In particular, potting compound structural reinforcement used in the assembly of composite structures is one area that includes additional cost due to waste.

Composite structures typically include honeycomb cell cores or other structurally enhanced cores. Potting compounds, typically epoxy based syntactic foam in the aerospace industry, are inserted into selected sections of the cores to add structural integrity for specific applications to the panel. Many potting compounds that are used for this purpose are "single part," that is they are pre-mixed and applied in one step. Single part potting compounds are high viscosity putty-like compounds that are susceptible to forming pockets of air contamination from handling and processing.

Generally, potting compounds such as these have been inserted into composite cell structures through a vacuum bag technique. In these techniques, the composite panel is masked to expose cells for inserting potting compound. Then patties of potting compounds are stacked over the composite panel and a vacuum bag is placed over the panel and patties. A vacuum is drawn and the bag then pressures the compound into the cells. The vacuum also assists to remove displaced air pockets within the cells. Due to the high viscosity of the potting compounds, however, pockets of air sometimes remain trapped within the cells or between patties. If post production analysis of the composite reveals undesirable air contamination, then the panel will require rework and reapplication of the potting compound to ensure that air pockets are not present. Therefore, it would be advantageous to reduce the susceptibility of air contamination while inserting potting compounds.

Once the insertion of the potting compound into the cells is complete, the excess potting compound is waste. In fact, the vacuum bag technique generally creates waste of one and a half to twice as much potting compound as is inserted into the cells. The excess potting compound is required in order to avoid under fill and voids in individual cells. Unfortunately, the excess potting compound is now deformed and may have inadvertent pockets of air contamination that proscribes its reuse in other filling operations. The excess is discarded and this results in a cost of one and a half to twice as much expense on potting compound for the amount used. Therefore, it would be advantageous to reduce the cost of inserting potting compounds by reducing the amount of waste generated.

It should also be noted that the excess potting compound removal techniques are manual and quite labor intensive. Generally, the excess must be scraped off by hand with a trowel. Again, this contributes to the cost of production. Therefore, it would be advantageous to reduce the labor cost of removing the excess potting compound.

BRIEF SUMMARY OF THE INVENTION

Therefore, a potting compound injection apparatus and method of injecting a potting compound into composite panel cells are provided. According to one embodiment, the potting compound injection apparatus comprises a pneumatic tube that holds the potting compound. The pneumatic tube has a first end with a relatively large opening that releases potting compound. The pneumatic tube has a second end with a substantially smaller opening. The second end receives pneumatic pressure from a pneumatic pressure source. The tube has a piston disposed within for applying pressure to the potting compound disposed within the tube. As such, the pneumatic pressure source applies pressure to the piston and thus the piston applies pressure the potting compound. The potting compound is forced out the first end of the pneumatic tube. The apparatus for injecting potting compound is generally used for injecting potting compound into cells of a composite panel. As such, the first end of the pneumatic tube is held against the panel, the air pressure is applied, and the potting compound is released into the cells of a panel.

Another aspect of the potting compound injection apparatus includes a frame for holding the pneumatic tube. The frame includes a receptacle for receiving and retaining a pneumatic tube. A movable joint interconnects the pneumatic tube to the frame, typically via the receptacle. As such, the joint permits motion of the first end of the pneumatic tube throughout a conical region. This permits the first end of the pneumatic tube to be pressed against a panel not level with the first end of the pneumatic tube. Accordingly, the first end moves through a cone of motion and levels out on the surface in the plane of the panel. One embodiment of the movable joint comprises a gimbal, and another embodiment of the movable joint comprises a ball and socket joint.

In accordance with another advantageous aspect, the frame also includes a hydraulic ram apparatus. The hydraulic ram apparatus exerts force in a downward direction on the tube so that the first end of the pneumatic tube is pressed against a composite panel. One embodiment of the hydraulic ram apparatus comprises at least two rams symmetrically interconnected to the pneumatic tube. As such, the symmetrical rams provide an even application of force against the first end of the pneumatic tube.

Another advantageous aspect of the frame also includes an extendable arm having a first end and a second end. The first end of the extendable arm is interconnected to the pneumatic tube. That is to say that the arm is either directly connected, attached, or connected via other mechanical linkages to the pneumatic tube. The extendable arm permits movement of the first end of the arm relative to the second end of the arm. Having multiple hinges on the arm therefore permits movement of the arm, and thus the pneumatic tube, in at least two dimensions. As such, the potting compound injection apparatus may be moved in two dimensions about a composite panel in order to inject potting compound at various locations.

An alternative embodiment of the frame comprises a counterbalancing weight and pulley system interconnected to the second end of the extendable arm. The weight and pulley system permits motion of the arm, and thus the pneumatic tube, in a vertical dimension.

Another aspect of the potting compound injection apparatus includes a frame having a receptacle for holding the pneumatic tube. As such, the receptacle permits interconnection of the pneumatic tube to the frame. The previously described movable joint is, in one embodiment, also interconnected to the pneumatic tube by way of the receptacle.

There is also provided a method of injecting a potting compound into cells within a panel using a pneumatic tube. The tube is provided with potting compound. The open end of the pneumatic tube is placed proximate panel cells that are to be injected with potting compound. Pressure is applied to the potting compound within the pneumatic tube such that the compound is released from the open end into the panel cells. According to one embodiment of the method, the step of placing the open end of the pneumatic tube includes exerting force against a surface of the panel with the open end of the pneumatic tube in order to hold the tube in place. Generally, the open end of the pneumatic tube is placed against the composite panel in a substantially flush relationship. According to a further embodiment, the step of placing the open end of the pneumatic tube substantially flush to the panel also includes moving the pneumatic tube in at least two dimensions toward the panel cells that are to be injected.

According to the present inventions, embodiments of a potting compound injection apparatus and a method of injecting potting compound in a panel with cells are provided. By avoiding leakage between the end of the pneumatic tube and the composite panel cells, the potting compound injection apparatus and method facilitates a reduction in the amount of potting compound to fill cells within a panel. As such, a lesser amount of excess potting compound, if any, is left after the process. Additionally, cumbersome vacuum bag techniques are avoided. Therefore, the compound injection apparatus and method advantageously improve the process of inserting potting compounds into composite panel cells. Other advantages and aspects of the present inventions will become apparent to one of ordinary skill in the art with respect to the description below.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
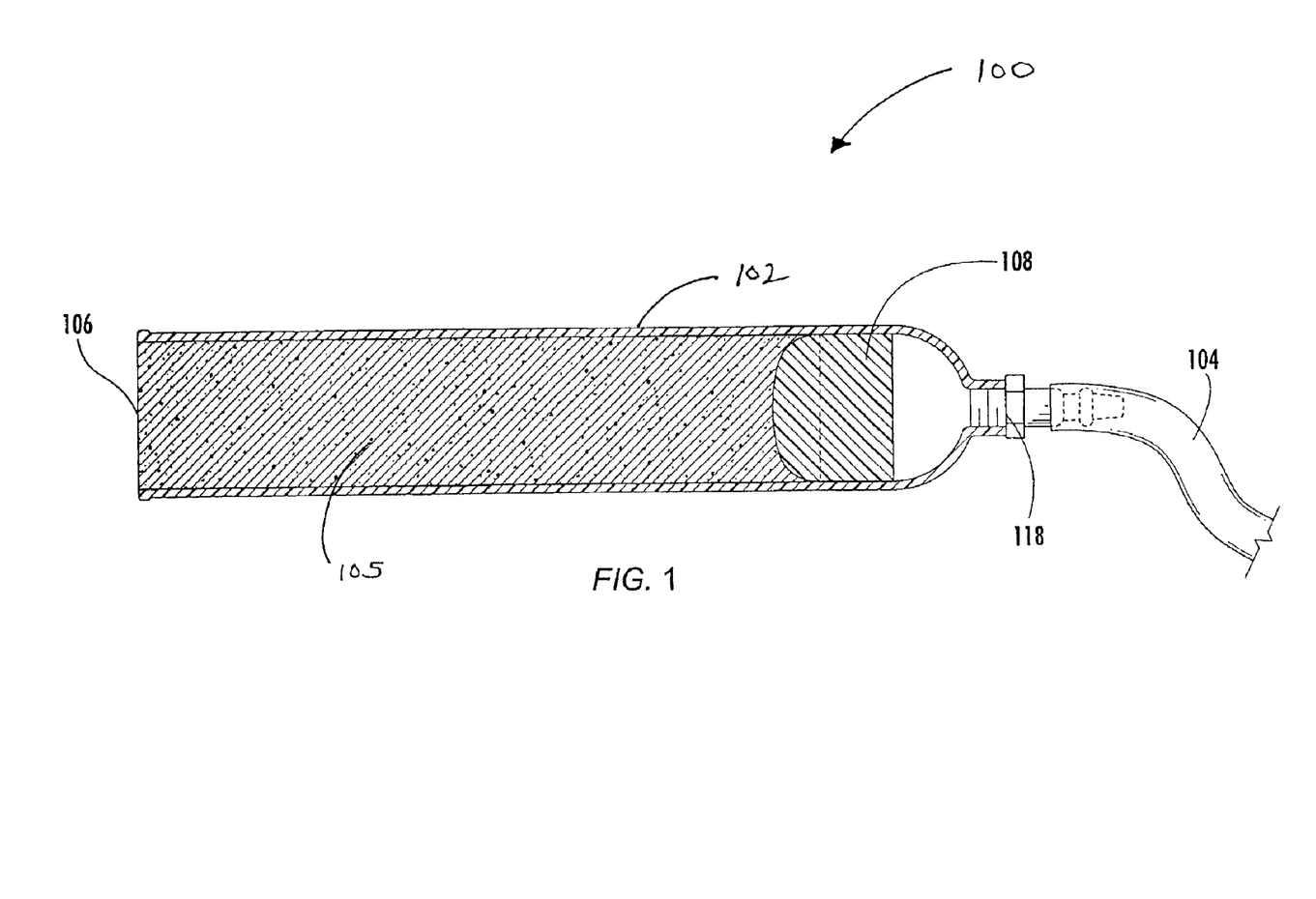
FIG. 1 is a schematic view of a potting compound injection apparatus according to one embodiment of the present invention.

Referring now to FIG. 1, one embodiment of a potting compound injection apparatus 100 is illustrated in cross section. A pneumatic tube 102 has an open end 106 and an opposed end 118 connected to an air source 104. The tube 102 includes a piston 108 that transfers pneumatic pressure from the air source 104 to a potting compound 105 located within the tube 102. The potting compound is inserted into the tube 102 such that the piston 108 lies between the opposed end 118 and the potting compound. Therefore, when the air source 104 applies pneumatic pressure to the piston 108, the potting compound is urged out the open end 106 of the tube.

Figure 2:
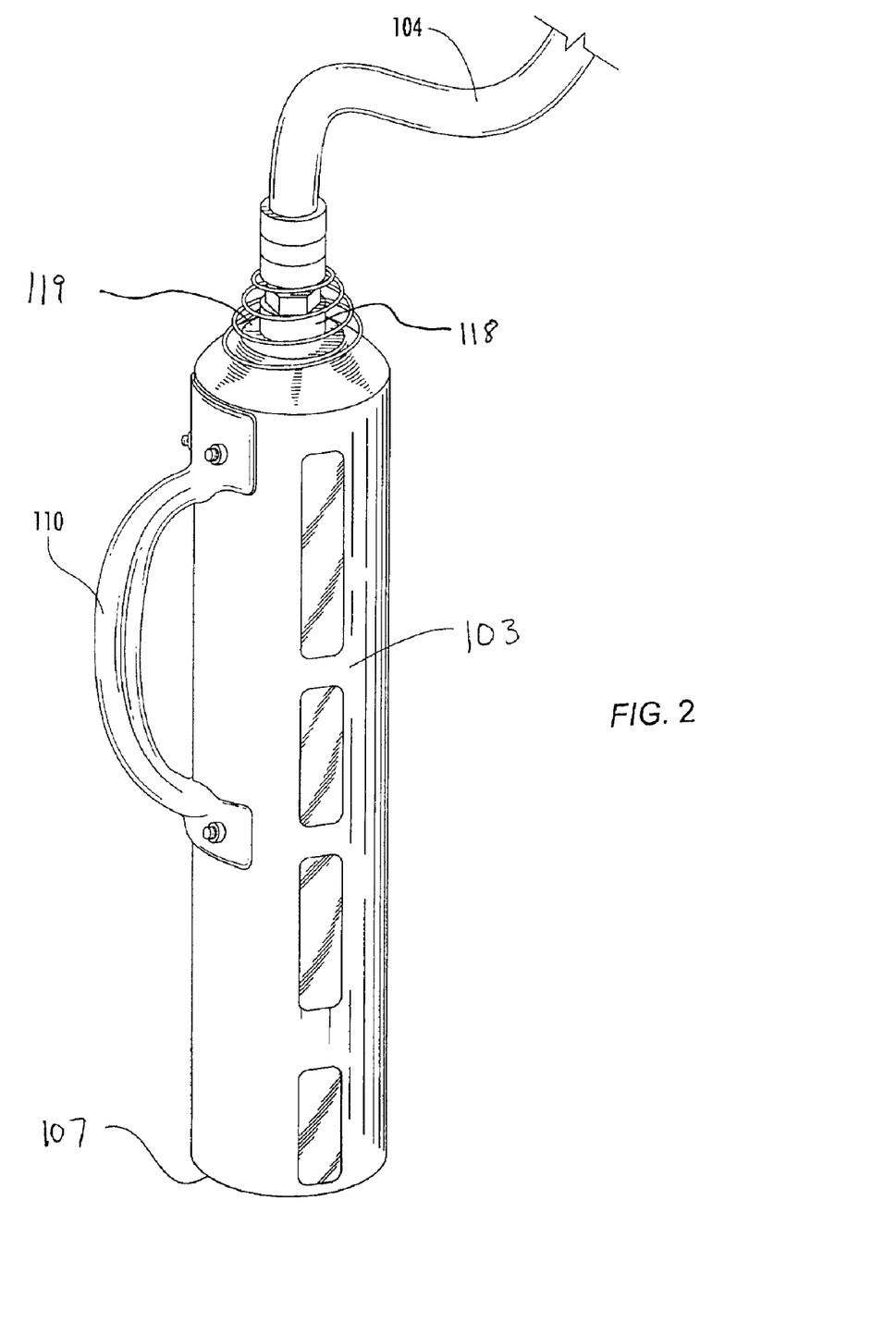
FIG. 2 is a cross section view of a potting compound injection apparatus according to one embodiment of the present invention.

FIG. 2 illustrates a receptacle 103, which is a tube holder having a cylindrical body and handle. With continued reference to FIGS. 1 and 2, the receptacle 103 receives the pneumatic tube 102 through a large opening on one end 107, and the pneumatic tube is therefore disposed within the receptacle. Another end of the receptacle defines an aperture 119 to permit the opposed end 118 of the pneumatic tube to be attached to the pneumatic pressure source 104. The pneumatic tube 102 and receptacle 103 may be manually positioned proximate a panel or the like for inserting potting compound into panel cells.

Potting compounds are traditionally available in a patty form. The potting compound inserted into the tube 102 may advantageously be prepackaged in a disposable plastic tube. As such, a single piece of potting compound may be inserted into a composite panel without cutting or stacking. In this regard, the potting compound is not deformed or altered, and thus a significant source of air pocket contamination is precluded from entering the potting compound. Alternatively, the potting compound may take other forms and be introduced into the tube and injection apparatus in other manners.

Figure 3:
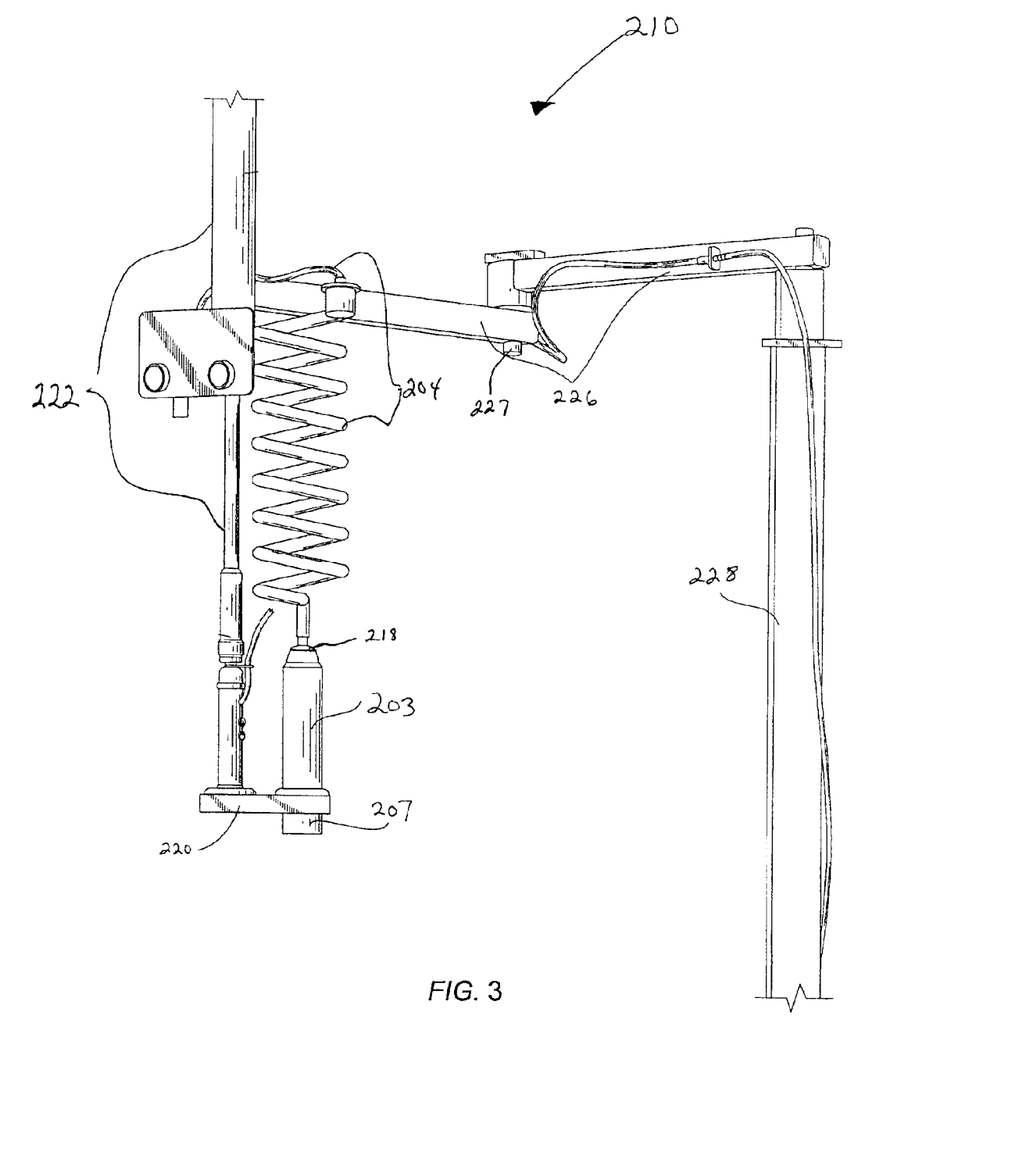
FIG. 3 is a schematic view of a potting compound injection apparatus and a frame according to one embodiment of the present invention.

Referring now to FIG. 3, another embodiment also includes a frame 210 for maneuvering a pneumatic tube proximate to a panel. The frame 210 of this embodiment also includes a receptacle 203 for holding the pneumatic tube 102 illustrated in FIG. 1. FIG. 3 also illustrates one embodiment of this receptacle 203 including a cantilevered foot 220 to provide support to the receptacle. Interconnected to the foot 220 is a hydraulic ram apparatus 222. As used herein, when a device or element is "interconnected" to another device or element, it may be directly connected, attached, or connected by one or more intervening devices or elements. As such, the frame 210, elements of the frame, and other mechanical devices on the frame are therefore interconnected to the pneumatic tube, when inserted into the receptacle 203.

The frame 210 of FIG. 3 includes the hydraulic ram apparatus 222 interconnected to the receptacle 203 via the cantilevered foot 220. In this regard, the hydraulic ram apparatus 222 applies downward pressure to the cantilevered foot 220 and thus to the receptacle 203 and inserted pneumatic tube as they are pressed against a composite panel. As used herein, hydraulic ram apparatus 222 refers to components of a fluid operated actuator and these may include a sheath, an extendable rod, valves, supply lines, various controls, etc. Fluids for use in a hydraulic ram include liquid fluids, such as hydraulic oils, etc., and gaseous fluids, such as air, nitrogen, etc. In one advantageous embodiment, the hydraulic ram 222 is a pneumatic ram controlled from an air source 204. As such, a single air source 204 may advantageously supply both the pneumatic tube and the ram 222 and therefore simplify operation and maintenance of the potting compound injection apparatus 200. As the pneumatic tube and ram 222 may not necessarily operate at the same pressure, one or more air reducing valves and/or air regulators may be provided in the air supply to control pressure to each the ram 222 and the pneumatic tube. Additionally, the differential sizes of the ram 222 and pneumatic tube may be selected to achieve a desired pressure differential and therefore reduce the required number of air regulators.

According to one embodiment, the hydraulic ram apparatus 222 is interconnected to an extendable arm 226. The arm 226 provides movement of the receptacle 203 and ram 222 by way of a series of hinged joints 227 and or other extension mechanisms. Therefore, within the range of motion of the arm 226, the receptacle 203 may be moved to various areas about a composite panel. Therefore, a pneumatic tube inserted into the receptacle may insert potting compound in the composite cells at various locations without requiring repositioning of the composite panel. The arm 226 is interconnected at one end to a stanchion 228 for supporting the arm 226. As such, the stanchion 228 provides support for the frame 210. The stanchion 228 may also permit mobility if the stanchion 228 is not permanently fixed. However, it is expected that the frame 210 may not require maneuverability in all circumstances and may be permanently affixed to a wall, floor, building stanchion, beam, or other assembly capable of supporting the frame 222 without departing from the spirit or scope of the present invention.

One advantageous embodiment of a potting compound injection apparatus also includes a movable joint that interconnects the receptacle 203 to the frame 222. Composite panels are not always level and may include build ups or non-planar shapes that require the injection of the potting compound to be accomplished at an angle. In many applications, at least ten degrees of freedom on either side of a reference plane is required. The movable joint provides a conical range of motion to the larger end 206 of the receptacle 203, and thus an inserted pneumatic tube.

Figure 4:
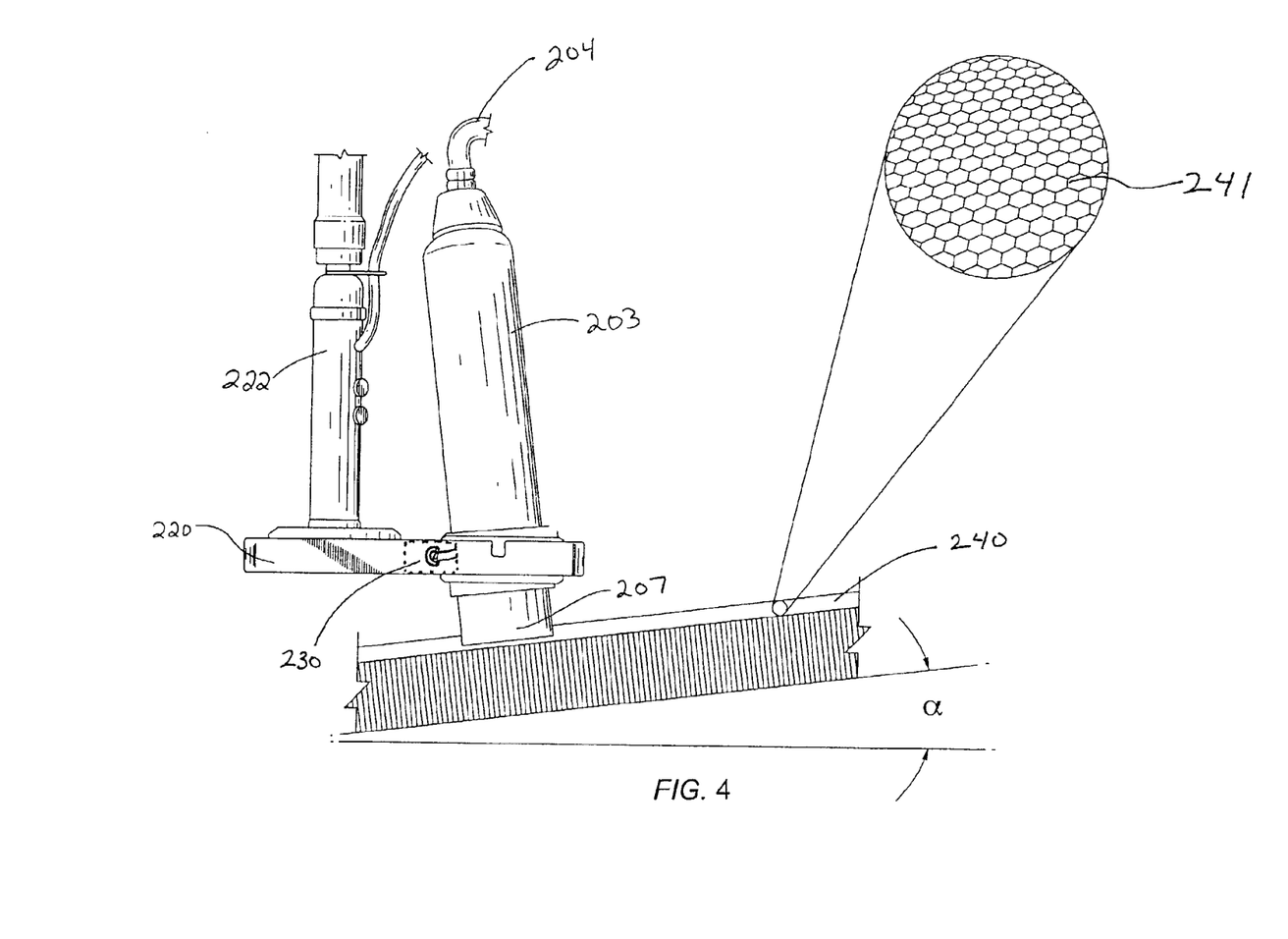
FIG. 4 is a schematic view of a potting compound injection apparatus and frame receptacle according to one embodiment of the present invention.

As illustrated in FIG. 4, one embodiment of the movable joint comprises a ball and socket joint 230. As can be seen, the ball and socket joint 230 permits out of plane motion of the end 207 of the receptacle 203. This feature permits the receptacle 203 and an inserted pneumatic tube to be pressed against to a composite panel 240, which is at an angle, α, to a reference plane. The ball and socket joint 230 permits motion in a conical region about the open end 207 to at least the angle α. As such, the movable joint permits the open end 207 of the receptacle to lie substantially flush with the plane of the composite panel 140, even as the panel defines different planes.

Figure 5:
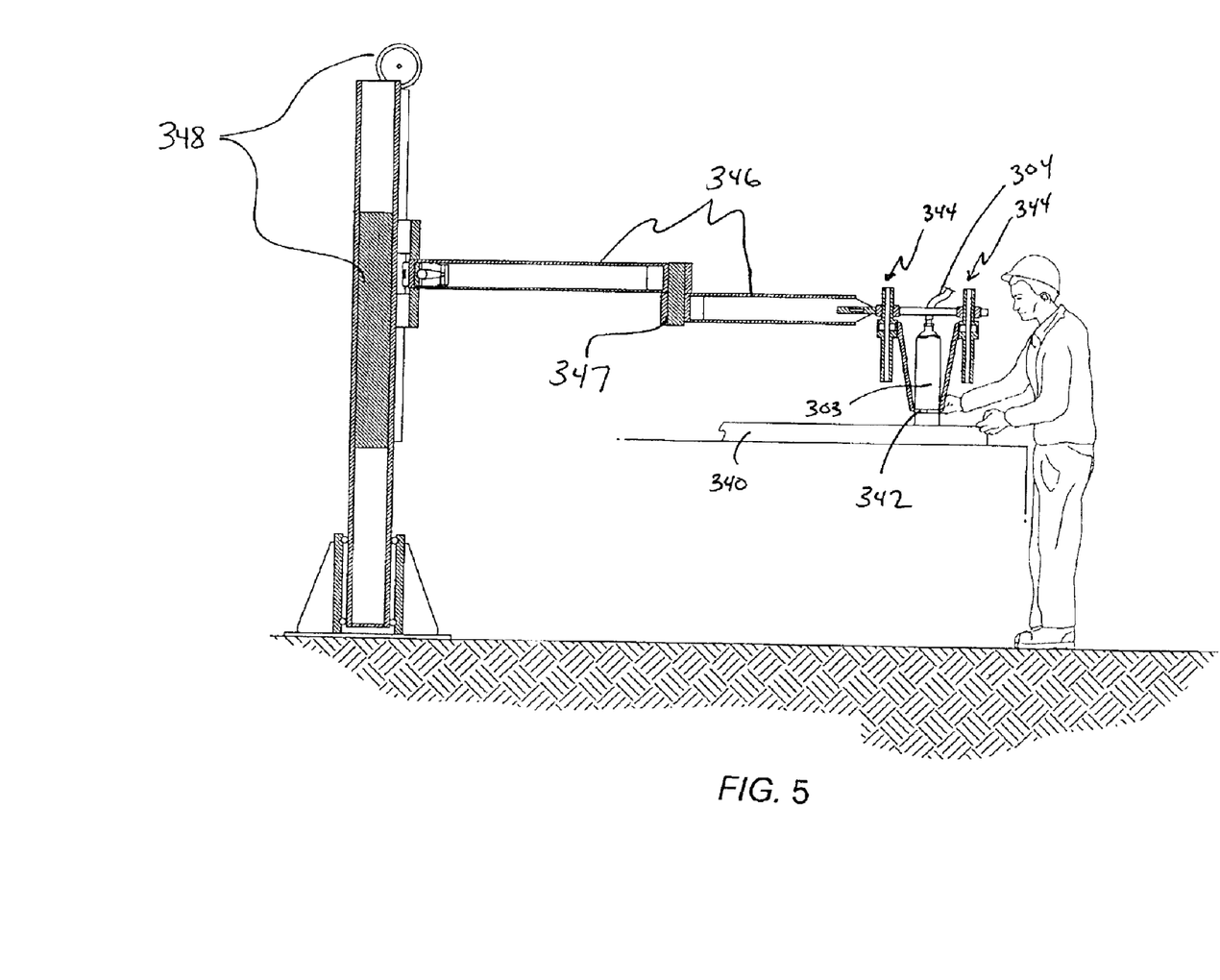
FIG. 5 is a schematic view of a potting compound injection apparatus and a frame according to one embodiment of the present invention.

Referring now to FIG. 5, another embodiment of a potting compound injection apparatus and frame is illustrated. A receptacle 303 and hydraulic ram apparatus 344 of this embodiment are also interconnected to an extendable arm 346. This extendable arm 346 permits movement of the pneumatic tube 302 through a series of joints and hinges 347. This embodiment of an extendable arm 346 is also interconnected to a mechanical counterbalancing weight and pulley system 348 at one end of the arm 346. The counterbalancing weight and pulley system 348 provides a weighted resistance to the arm 346 in the vertical plane. The weights and pulleys are chosen to appropriately balance the forces of the arm 346 to provide stable vertical maneuvering of the arm 346. In this regard, the arm 346 may be maneuvered both vertically, by the counterbalancing system, and in another non-vertical plane, by hinges and joints. As such, composite panels 340 of various heights and sizes may be injected with potting compounds without requiring additional movement or maneuvering of the composite panel 340 itself.

Figure 6:
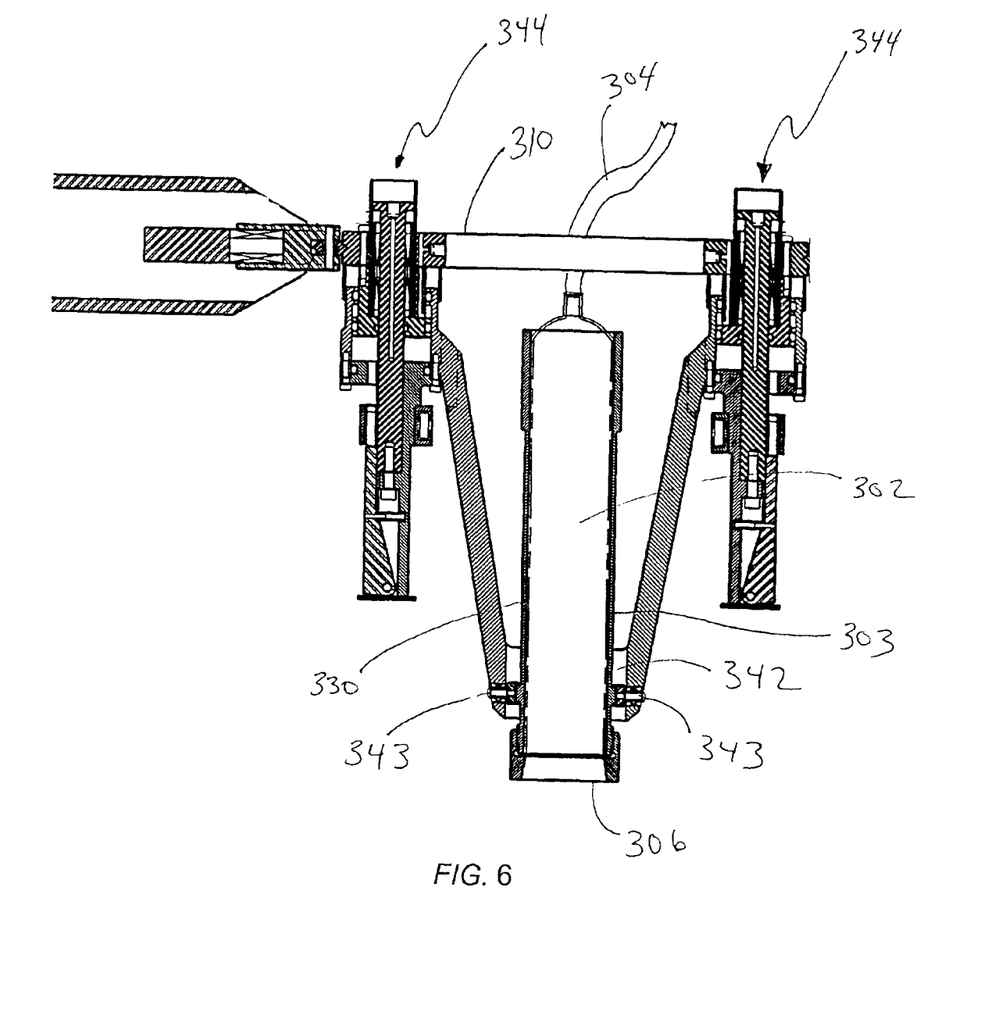
FIG. 6 is a cross section view of a potting compound injection apparatus according to one embodiment of the present invention.

Referring now to FIG. 6, the receptacle 303 and ram apparatus 344 of this embodiment are more closely illustrated. This particular receptacle includes a ring 342 providing interconnection of the receptacle 303 and pneumatic tube 302 to a movable joint. This particular embodiment of a movable joint comprises a gimbal 343. As such, a gimbal includes rings 342 and joints that permit motion through a range of out of plane angles, thus permitting motion through a conical range about the open end 306 of the receptacle 303 and the pneumatic tube 302. The movable joint, therefore, is not limited to a single joint but may comprise one or more joints, rings, or other devices that permit movement in a least a conical range of motion about the larger end of the pneumatic tube 302. For example, this particular embodiment also includes a rotating ring 310 interconnected to the receptacle. The ring 310 engages hydraulic ram actuators 344 with a bearing train to permit 360° motion of the receptacle.

On each side of the pneumatic tube 302 and interconnected in a substantially symmetric fashion are hydraulic ram actuators that comprise a part of the hydraulic ram apparatus 344. In this regard, the hydraulic ram apparatus 344 provides an application of force to either side of the pneumatic tube 302. As such, the application of symmetric forces provide a more uniform distribution of forces about the larger end 306 of the pneumatic tube 302 as it presses substantially flush to the composite panel 340. An even sealing force therefore provides a desirable sealing characteristic about the end of the tube 302 and minimizes waste of potting compound that may escape from between the potting injection apparatus 300 and the composite panel 340.

As previously described, the potting compound has a high viscosity, and the viscosity is temperature dependent. Therefore, this embodiment also includes a heating element 330 attached to the inside of the receptacle 303 in order to warm the potting compound to a temperature corresponding to an optimum viscosity. For example, many aerospace industry epoxy based syntactic foams display optimum viscosity at 80 F., and the heating element may be controlled to maintain a temperature within a band about 80 F.

Having described advantageous embodiments of a potting compound injection apparatus, it is now appropriate to turn to an advantageous method of injecting a potting compound into composite panel cells. Typically, potting compound is inserted into composite panel cells, such as a honeycomb core 241 as seen in FIG. 3 or other structural cells. With concurrent reference to FIGS. 1 and 3, the open end 207 of the receptacle 203 is proximate to the composite panel 240 to facilitate inserting the potting compound from an inserted pneumatic tube 102. In this regard, pressure is applied to the pneumatic tube 102 and piston 108 after the open end 106 is placed over the cells that are required to be filled. Cells of the composite panel 240 that are not to be filled with potting compound are first masked off. Predetermined patterns of masking therefore define the openings to the cells in which it is desired to insert potting compounds. These patterns usually depend upon engineering and structural requirements that are known beforehand according to plans and drawings for the composite structure and its use in a larger apparatus.

The pressure is exerted on the receptacle 203 and the tube 102 in a downward direction flush with the surface of the composite panel 240 in order to seal and effectively limit the flow of potting compound directly into the unmasked cells. According to one embodiment, pressure is applied downward onto the composite panel 240 by the ram 222 in order to seal the open end 207 of the tube substantially flush to the panel. After the pressure of the ram 222 has been applied to hold the open end 206 to the composite panel, the air pressure to the pneumatic tube 202 may then be applied to exert the potting compound out the open end 206 of the cylinder and thus into the composite panel 240. Upon completion of injecting the potting compound, the pneumatic pressure to the tube 202 is shut off, and then pneumatic pressure to the ram 222 may be shut off so that the cylinder may be lifted from the composite panel 240, refilled, and prepared for other injection operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for injecting a potting compound into cells within a panel, comprising:
    a pneumatic tube holding the potting compound, the tube having a first end having an opening capable of releasing the potting compound and second end having an opening substantially smaller than the first end opening for receiving pneumatic pressure;
    a piston disposed within the pneumatic tube and capable of applying pressure to the potting compound disposed within the tube such that when the piston applies pressure the compound is released and the piston advances toward the first end of the pneumatic tube;
    a pneumatic pressure source to apply pressure to the piston from the closed end of the pneumatic tube; and
    a frame for holding the pneumatic tube, wherein the frame further comprises a receptacle for receiving and retaining the pneumatic tube such that an open end of the pneumatic tube is capable of being positioned against the panel.

2. The apparatus according to claim 1, wherein the frame further comprises a movable joint interconnected to the pneumatic tube, wherein the joint permits motion of the first end of the pneumatic tube throughout at least a conical region.

3. An apparatus for injecting a potting compound into cells within a panel, comprising:
    a pneumatic tube holding the potting compound, the tube having a first end having an opening capable of releasing the potting compound and second end having an opening substantially smaller than the first end opening for receiving pneumatic pressure;
    a piston disposed within the pneumatic tube and capable of applying pressure to the potting compound disposed within the tube such that when the piston applies pressure the compound is released and the piston advances toward the first end of the pneumatic tube;
    a pneumatic pressure source to apply pressure to the piston from the closed end of the pneumatic tube; and
    a frame for holding the pneumatic tube, wherein the frame further comprises a movable joint interconnected to the pneumatic tube, wherein the joint permits motion of the first end of the pneumatic tube throughout at least a conical region, and wherein the movable joint comprises a gimbal.

4. The apparatus for injecting a potting compound into cells within a panel, comprising:
    a pneumatic tube holding the potting compound, the tube having a first end having an opening capable of releasing the potting compound and second end having an opening substantially smaller than the first end opening for receiving pneumatic pressure;
    a piston disposed within the pneumatic tube and capable of applying pressure to the potting compound disposed within the tube such that when the piston applies pressure the compound is released and the piston advances toward the first end of the pneumatic tube;
    a pneumatic pressure source to apply pressure to the piston from the closed end of the pneumatic tube; and
    a frame for holding the pneumatic tube, wherein the frame further comprises a movable joint interconnected to the pneumatic tube, wherein the joint permits motion of the first end of the pneumatic tube throughout at least a conical region, and wherein the movable joint comprises a ball and socket joint.

5. An apparatus for injecting a Dotting compound into cells within a panel, comprising:
    a pneumatic tube holding the potting compound, the tube having a first end having an opening capable of releasing the potting compound and second end having an opening substantially smaller than the first end opening for receiving pneumatic pressure;
    a piston disposed within the pneumatic tube and capable of applying pressure to the potting compound disposed within the tube such that when the piston applies pressure the compound is released and the piston advances toward the first end of the pneumatic tube;
    a pneumatic pressure source to apply pressure to the piston from the closed end of the pneumatic tube; and
    a frame for holding the pneumatic tube, wherein the frame further comprises a movable joint interconnected to the pneumatic tube, wherein the joint permits motion of the first end of the pneumatic tube throughout at least a conical region, and wherein the frame further comprises a hydraulic ram apparatus capable of exerting force to the tube such that the first end of the pneumatic tube is capable of being pressed against the panel.

6. The apparatus according to claim 5, wherein the hydraulic ram apparatus comprises at least two rams symmetrically interconnected to the pneumatic tube.

7. The apparatus according to claim 5, wherein the frame further comprises an extendable arm having a first end and a second end, the first end of the extendable arm being interconnected to the pneumatic tube, wherein the extendable arm is capable of providing movement of the first end of the arm relative to the second end of the arm in at least two dimensions.

8. The apparatus according to claim 7, wherein the frame further comprises a counterbalancing weight and pulley system interconnected to the second end of the extendable arm and capable of permitting vertical movement of the arm.

9. The apparatus according to claim 7, the hydraulic ram apparatus is interconnected to the first end of the extendable arm, and the hydraulic ram apparatus thereby interconnects the extendable arm and the pneumatic tube.

10. A frame for holding a pneumatic tube for injecting potting compound into cells within a panel, the frame comprising:
   a receptacle for receiving and holding the pneumatic tube such that an open end of the pneumatic tube is capable of being positioned against the panel; and
   a hydraulic ram apparatus interconnected to the receptacle and capable of exerting force to the pneumatic tube such that the open end of the pneumatic tube is capable of being pressed against the panel.

11. The frame according to claim 10, further comprising a heating element disposed on the receptacle and capable of heating the potting compound to a temperature.

12. The frame according to claim 10, further comprising a movable joint interconnecting the hydraulic ram apparatus and the receptacle, wherein the joint permits motion of the open end of the pneumatic tube throughout at least a conical region.

13. The frame according to claim 12, wherein the movable joint comprises a gimbal.

14. The frame according to claim 12, wherein the movable joint comprises a bail and socket joint.

15. The apparatus according to claim 14, wherein the hydraulic ram apparatus comprises at least two rams symmetrically interconnected to the pneumatic tube.

16. The frame according to claim 10, further comprising an extendable arm having a first end and a second end, the first end of the extendable arm being interconnected to the receptacle, wherein the extendable arm is capable of providing movement of the first end relative to the second end in at least two dimensions.

17. The apparatus according to claim 16, wherein the frame further comprises a counterbalancing weight and pulley system interconnected to the second end of the extendable arm and capable of permitting vertical movement of the arm.

18. The frame according to claim 16, wherein the hydraulic ram apparatus is interconnected to the first end of the extendable arm, and the hydraulic ram apparatus thereby interconnects the extendable arm and the receptacle.

* * * * *

UNITED STATES PATENT AND TRADEMARK OFFICE
CERTIFICATE OF CORRECTION

PATENT NO. : 6,884,055 B2
DATED : April 26, 2005
INVENTOR(S) : Cox

It is certified that error appears in the above-identified patent and that said Letters Patent is hereby corrected as shown below:

Column 8,
Line 39, "Dotting" should read -- potting --.

Column 10,
Line 7, "bail" should read -- ball --.

Signed and Sealed this

Twelfth Day of July, 2005

JON W. DUDAS
*Director of the United States Patent and Trademark Office*